US011782608B1

(12) United States Patent
Richter et al.

(10) Patent No.: US 11,782,608 B1
(45) Date of Patent: Oct. 10, 2023

(54) ERROR INFORMATION SIGNALING FOR MEMORY

(71) Applicant: Micron Technology, Inc., Boise, ID (US)

(72) Inventors: Michael Dieter Richter, Ottobrunn (DE); Thomas Hein, Munich (DE); Casto Salobrena Garcia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/749,966

(22) Filed: May 20, 2022

(51) Int. Cl.
*G06F 3/06* (2006.01)
(52) U.S. Cl.
CPC .......... *G06F 3/0619* (2013.01); *G06F 3/0625* (2013.01); *G06F 3/0655* (2013.01)
(58) Field of Classification Search
CPC ..... G06F 3/0619; G06F 3/0625; G06F 3/0655
See application file for complete search history.

(56) References Cited

U.S. PATENT DOCUMENTS

| 2013/0326263 A1* | 12/2013 | Alameldeen ........ G06F 11/2205 714/6.2 |
| 2016/0231797 A1* | 8/2016 | Meir ...................... G06F 3/0625 |
| 2020/0278908 A1* | 9/2020 | Schaefer ............. G06F 11/1012 |

* cited by examiner

*Primary Examiner* — Mark A Giardino, Jr.
(74) *Attorney, Agent, or Firm* — Holland & Hart LLP

(57) ABSTRACT

Methods, systems, and devices for error information signaling for memory are described. A memory device may perform an error detection procedure while in a power-saving mode. Upon detecting an error, the memory device may indicate the error to a host device. In response to indicating the error, the memory device may receive a command to exit the power-saving mode. The memory device may comply with the command and exit the power-saving mode by enabling one or more interfaces of the memory device. The memory device may receive a request for error information over the one or more interfaces and, in response to the request, may transmit the error information to the host device.

25 Claims, 8 Drawing Sheets

ERROR INFORMATION SIGNALING FOR MEMORY

FIELD OF TECHNOLOGY

The following relates to one or more systems for memory, including error information signaling for memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
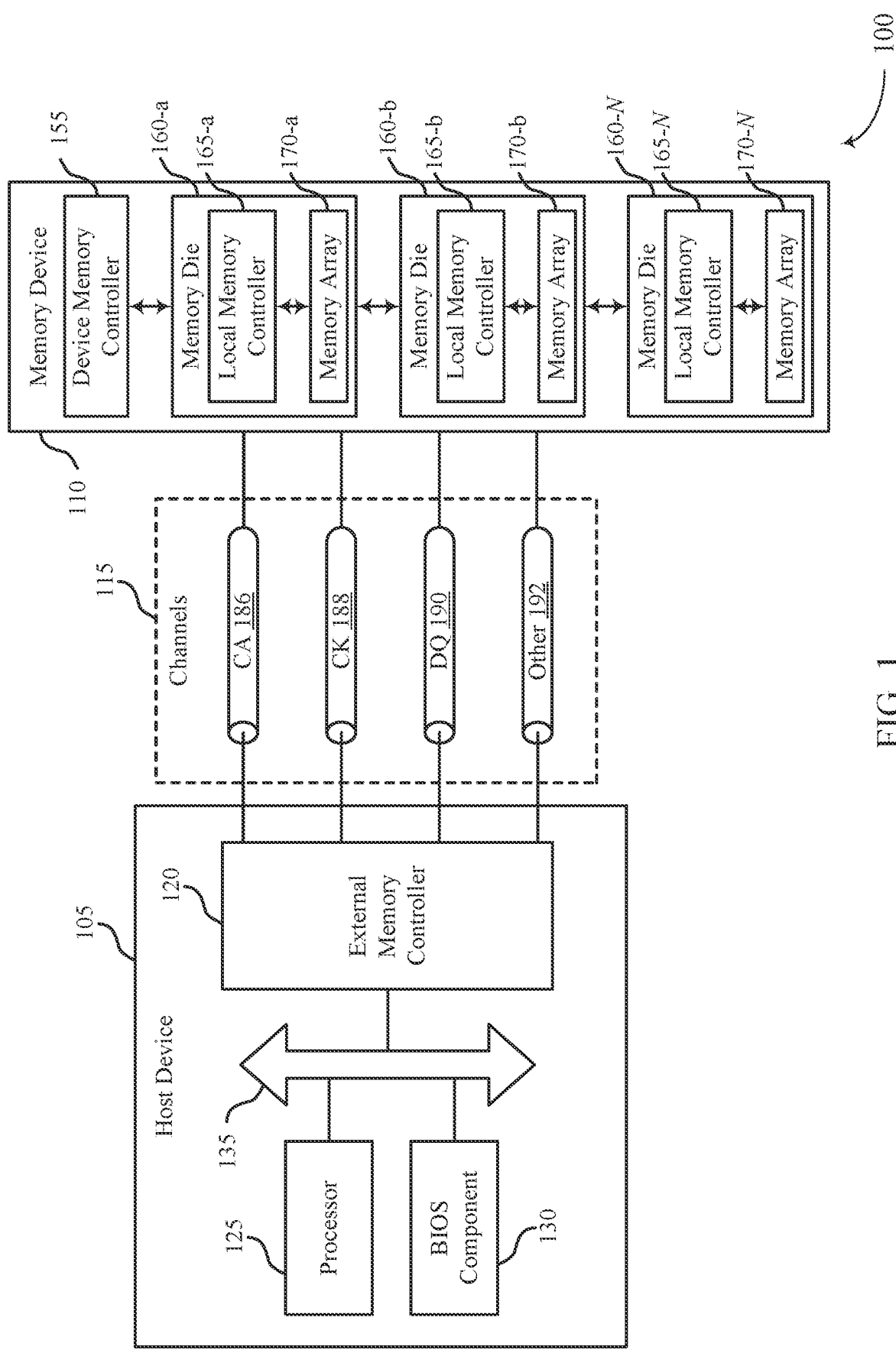
FIG. 1 illustrates an example of a system that supports error information signaling in accordance with examples as disclosed herein.

In some systems, a memory device may perform an error detection procedure in which the memory device checks for, and potentially corrects, one or more errors in data (e.g., codewords) stored in a memory array of the memory device. For example, a memory device may perform an error check and scrub (ECS) procedure in which the memory device progresses through a memory array in a systematic manner checking for one or more errors in data and correcting the one or more errors that are correctable.

In some examples, a memory device may perform an error detection procedure while the memory device is in a power-saving mode in which one or more interfaces between the memory device and a host device are disabled. If one or more errors are detected while the memory device is in the power-saving mode, the memory device may use one or more registers to store error information related to the one or more errors, such as the type of the one or more errors (e.g., correctable versus uncorrectable) and the address of the one or more errors, so that the host device can read the error information after the error detection procedure concludes. But due to limited register space, the memory device may overwrite the error information with new error information as additional errors are detected as part of the error detection procedure. So, a memory device that performs an error detection procedure while in the power-saving mode may be unable to provide comprehensive error information to a host device.

According to the techniques described herein, a memory device that performs an error detection procedure while in a power-saving mode may provide more comprehensive error information to a host device (relative to other techniques) by alerting the host device to one or more detected errors. For example, upon detection of an error while the memory device in the power-saving mode, the memory device may indicate to the host device (e.g., by asserting an alert pin) that an error has been detected. In response to the indication, the host device may instruct the memory device to exit the power-saving mode (which may include enabling one or more interfaces) so that the host device can obtain the error information from the memory device before the error information is over-written. By alerting the host device of errors as they are detected, the memory device may afford the host device the opportunity to obtain error information for errors detected while the memory device is in the power-saving mode.

Features of the disclosure are initially described in the context of systems and devices as described with reference to FIGS. 1 and 2. Features of the disclosure are described in the context of a process flow and a timing diagram as described with reference to FIGS. 3 and 4. These and other features of the disclosure are further illustrated by and described with reference to an apparatus diagram and flowcharts that relate to error information signaling for memory as described with reference to FIGS. 5 through 8.

FIG. 1 illustrates an example of a system 100 that supports error information signaling for memory in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-A) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be differential. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

In some examples, the channels 115 may be coupled with one or more interfaces between the host device 105 and the memory device 110. For example, the CA channels 186, the CK channels 188, or both, may be part of or coupled with an interface between the host device 105 and the memory device 110. A channel may refer to a transmission line and the termination pins of the transmission line (e.g., the termination pin at the host device 105 and the termination pin at the memory device 110).

The memory device 110 may support different modes of operation. For example, the memory device 110 may support an active mode in which interfaces between the memory device 110 and the host device 105 are enabled. The memory device 110 may also support a power-saving mode in which one or more interfaces between the memory device and the host device 105 are disabled. Disabling an interface may refer to configuring some or all of the driver(s) of the interface with a high impedance, or configuring some or all of the driver(s) of the interface to drive a static (constant, unchanging) signal (e.g., voltage) on the bus coupled with the interface. Disabling an interface may also include powering down some or all of the receiver(s) of the interface. Enabling an interface may refer to configuring the driver(s) of the interface with a low impedance, or configuring the driver(s) of the interface to drive dynamic (changing) signals. Enabling an interface may also include powering up receiver(s) of the interface. Thus, the power-saving mode may consume less power than the active mode.

In some examples, the power-saving mode, unlike the active mode, may include self-refresh operations. A refresh operation may refer to an access operation that overwrites the data in a set of memory cells with the same data, and a self-refresh operation may refer to a refresh operation that is initiated autonomously by the memory device 110 (as opposed to being initiated by the host device 105). In some examples, various internal circuits of the memory device 110 (e.g., internal clocks, internal reference voltage supplies) may be powered down, which may further reduce power consumption relative to other operating modes (e.g., the active mode).

In some examples, the memory device 110 may perform an error detection procedure. For example, the memory device 110 may perform an ECS procedure in which the memory device 110 checks for (and potentially correct) errors in the memory array of a memory die 160. The memory device 110 may intermittently (e.g., periodically) check a different location of the memory array for errors and may progress through the entire memory array within a threshold amount of time (e.g., 24 hours). To enable error detection and correction, the memory device 110 may use error correction code (ECC) encoding to generate codewords that include data bits and error detection/correction (EDC) bits (which may also be referred to as parity bits) that are based on the data bits. To detect an error in a codeword, the memory device 110 may read the codeword from memory and perform ECC decoding. If the memory device 110 detects a correctable error (as opposed to an uncorrectable error) in a codeword, the memory device 110 may correct the error by overwriting the location that stores the codeword with the correct version of the codeword.

For a memory device configured to correct n-bit errors, an error in a codeword may be classified as a correctable error if the error is in or fewer bits and may be classified as an uncorrectable error if the error is n+1 or more bits. So, for a memory device configured to correct 1-bit errors, a 1-bit error may be classified as a correctable error and a 2-bit error may classified as an uncorrectable error.

In some examples, the memory device 110 may perform an error detection procedure (e.g., an ECS procedure) while the memory device 110 is in the power-saving mode. Because the host device 105 is unaware of errors detected during the error detection procedure, the memory device 110 may be unable to provide error information to the host device 105 until after conclusion of the error detection procedure. But due to limited register space at the memory device 110, the memory device 110 may be unable to accumulate the error information for the errors detected as part of the error detection procedure. For example, the memory device 110 may overwrite error information for a first error with error information for a second error encountered after the first error. Alternatively, the memory device 110 may record error information for the first error encountered and refrain from recording error information for any additional errors encountered after the first error. So, in either case, the memory device 110 may provide incomplete error information to the host device 105, which may prevent the host device 105 from effectively managing the memory device 110.

According to the techniques described herein, the memory device 110 may alert the host device 105 if the memory device 110 detects an error as part of an error detection procedure performed while the memory device 110 is in the power-saving mode. In response to the alert, the host device 105 may determine whether to obtain error information for the error from the memory device. If the host device 105 determines to obtain the error information for the error, the host device 105 may prompt the memory device 110 to at least partially exit the power-saving mode (e.g., enable the one or more disabled interfaces) so that the memory device 110 can transmit the error information to the host device 105 before the error information is overwritten with error information for a newly detected error.

Figure 2:
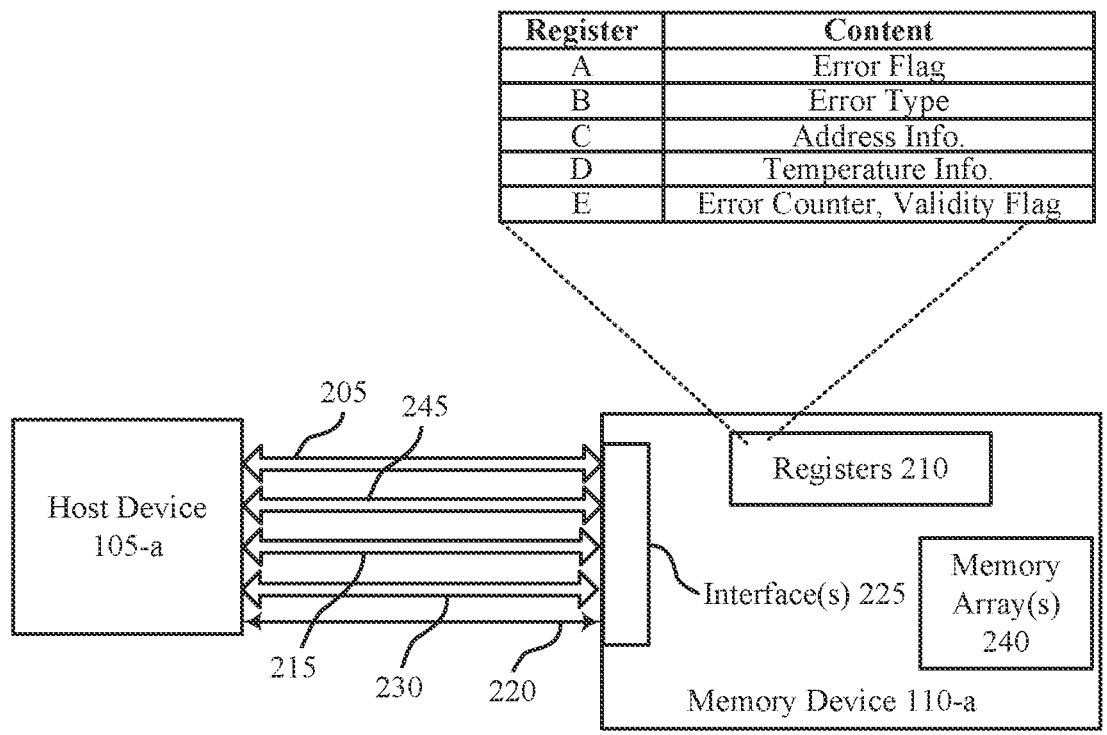
FIG. 2 illustrates an example of a system that supports error information signaling in accordance with examples as disclosed herein.

FIG. 2 illustrates an example of a system 200 that supports error information signaling for memory in accordance with examples as disclosed herein. The system 200 may be an example of the system 100 described with reference to FIG. 1. The system 200 may include a host device 105-*a*, which may be an example of a host device 105 as described with reference to FIG. 1, and a memory device 110-*a*, which may be an example of a memory device 110 as described with reference to FIG. 1. The memory device 110-*a* may alert (potentially on an error-by-error basis) the host device 105-*a* to errors detected as part of an error detection procedure performed by the memory device 110-*a* while the memory device is in the power-saving mode.

The system 200 may include various transmission lines that are coupled with, and configured to convey information between, the host device 105-*a* and the memory device 110-*a*. A transmission line may be terminated by a respective pin (e.g., a conductive node) at each device.

The transmission lines may be grouped into buses that are coupled with respective interfaces of the interfaces 225. For example, the system 200 may include a command and address (C/A) bus 205 that is coupled with a C/A interface and that is configured to convey command information and address information. The system 200 may additionally or alternatively include a data bus 215 that is coupled with a data interface and that is configured to convey data. The system 200 may additionally or alternatively include a metadata bus 245, which may be coupled with a metadata interface and configured to convey metadata. The system 200 may additionally or alternatively include a clock bus 230 that is configured to convey one or more clock signals.

The buses may be coupled with one or more interface(s) 225. For example, the C/A bus 205 may be coupled with a C/A interface and the clock bus 230 may be coupled with a clock interface. And so on and so forth. An interface may include or be coupled with one or more drivers (which may be configured to drive signals on the transmission lines of the bus coupled with the interface), one or more receivers (which may be configured to receive signals on the transmission lines of the bus coupled with the interface), or both.

In some examples, the system 200 may include an alert transmission line 220, which may be configured to indicate error detection. Although shown separate from the buses, the alert transmission line 220 may be included in one of the buses and may be coupled with an interface of the interface(s) 225.

The memory device 110-*a* may support an active mode and a power-saving mode, among other potential operating modes. In the active mode, the memory device 110-*a* may enable the interface(s) 225 by powering the receiver(s) of the interface(s) 225 and configuring the driver(s) of the interface(s) 225 with a low impedance (or configuring the driver(s) to drive dynamic signals). The memory device 110-*a* may disable self-refresh operations as part of the active mode.

In the power-saving mode, the memory device 110-*a* may disable one or more of the interface(s) 225. For example, the memory device 110-*a* may disable the C/A interface and the clock interface. The memory device 110-*a* may disable the clock interface by powering down the receiver(s) of the clock interface and configuring the driver(s) of the clock interface with a high impedance (or configuring the driver(s) of the clock interface to drive a static signal on the bus coupled with the interface). The memory device 110-*a* may disable the C/A interface by powering down some, but not all, of the receiver(s) of the C/A interface and configuring some, but not all, of the driver(s) of the C/A interface with a high impedance (or configuring some, but not all, of the driver(s) of the C/A interface to drive a static signal on the bus coupled with the interface). Thus, the memory device 110-*a* may be capable of receiving a command over at least one transmission line of the C/A interface (e.g., the transmission line coupled with the enabled receiver) while the memory device 110-*a* is in the power-saving mode. In some examples, the receiver of the C/A interface that is enabled may be different than the receiver enabled in the active mode. For example, the memory device 110-*a* may enable a first receiver in the active mode and may enable a second receiver (which may consume less power than the first receiver) in the power-saving mode.

To enable transmission of an alert signal while in the power-saving mode, the memory device 110-*a* may enable a driver of the interface coupled with the alert transmission line (and may disable the other drivers of the interface to save power).

The memory device 110-*a* may store data (e.g., codewords) in the memory array(s) 240. To improve the reliability of the data, which may become corrupted over time, the memory device 110-*a* may perform an error detection procedure while the memory device 110-*a* is in the power-saving mode (which the memory device 110-*a* may enter to save power). Performing the error detection procedure (which may consume processing resources and increase operational latency) while the memory device 110-*a* is in the power-saving mode (as opposed to the active mode) may allow the memory device 110-*a* to improve data reliability without negatively impacting user experience, among other advantages.

If the memory device 110-*a* detects an error as part of the error detection procedure in the power-saving mode, the memory device 110-*a* may store (e.g., record) error information associated with the error in local storage media, such as the registers 210. For instance, the memory device 110-*a* may store (e.g., in register A) an error flag (e.g., bit) that indicates whether an error has been detected as part of the error detection procedure. Additionally or alternatively, the memory device 110-*a* may store (e.g., in register B) error type information, which may indicate the type of error (e.g., whether the error is correctable or uncorrectable). The error type information may be represented by one or more error type flags. The error type flags may include an uncorrectable error flag (e.g., one or more register bits) that indicates an uncorrectable error and a correctable error flag (e.g., one or more register bits) that indicates a correctable error.

In some examples, the memory device 110-*a* may store (e.g., in register E) counter information (denoted "Error Counter") that indicates the total quantity of errors encountered during a complete cycle of the error detection procedure. A complete cycle of the error detection procedure may refer to performance of the error detection procedure on a threshold amount of the memory array(s). In some examples, the memory device 110-*a* may store (e.g., in register E) a validity flag (e.g., a bit) that indicates whether the counter information is valid.

In some examples, the memory device 110-*a* may store (e.g., in C) address information for a detected error (denoted "Address Info"). The address information for an error may indicate the bank address, the row address, the column address, or any combination thereof, associated with the error. For example, if the error is detected in a codeword that is stored in a location of the memory array(s) 240 with bank address x, row address y, and column address z, the address information may indicate one or more of bank address x, row address y, and column address z.

In some examples, the memory device 110-*a* may also use the registers 210 to store temperature information. For example, the memory device 110-*a* may store (e.g., in register D) the maximum temperature measured during an access operation (e.g., a write operation) for the memory array(s) 240. The memory device 110-*a* may additionally or alternatively store the current (e.g., most recently measured) temperature of the memory device 110-*a*. The temperature information may allow the host device 105-*a* to determine whether an error is due to temperature rather than e.g., degradation of the memory array, which may impact how the host device 105-*a* manages the memory array.

As noted, the memory device 110-*a* may store (e.g., in register A) an error flag that indicates whether an error (of any type) has been detected during the error detection procedure. In some examples, the error flag may be set based on the error type information stored in register B. For example, the error flag may be based on the correctable error flag and the uncorrectable error flag. In some examples, the error flag may be based on an OR operation of the correctable error flag and the uncorrectable error flag.

Although described with reference to specific registers, the error information described herein may be split among registers or combined in registers in various other ways that are contemplated and within the scope of the present disclosure.

Due to limited register space, the memory device 110-*a* may write error information for the first-detected error and refrain (e.g., until the first error information is cleared) from writing error information for subsequently detected errors. Alternatively, the memory device 110-*a* may overwrite the error information in the registers 210 as new errors are detected as part of the error detection procedure. For example, the memory device 110-*a* may replace error information for a first error with error information for a second error. To ensure that the host device 105-*a* is able to access error information (which may otherwise go unrecorded or be overwritten), the memory device 110-*a* may alert the host device 105-*a* of a detected error (e.g., before the associated error information is overwritten or before a second error is detected and goes unrecorded).

For example, upon determining that an error has been detected as part of the error detection procedure in the power-saving mode, the memory device 110-*a* may indicate the error to the host device 105-*a*. In some examples, the memory device 110-*a* may determine that an error has been detected based on the error flag, which the memory device 110-*a* may set based on detecting an error. In some examples, the memory device 110-*a* may indicate the error by modifying the voltage on the alert transmission line 220 from a first level (e.g., a default level) to a second level.

The memory device 110-*a* may indicate errors on an error-by-error basis regardless of the type of error. Alternatively, the memory device 110-*a* may indicate errors based on the satisfaction of one or more conditions. For example, the memory device 110-*a* may indicate an error if the same memory array has experienced a threshold quantity of errors. In some examples, the threshold quantity of errors for a memory array may vary with the type of error.

Based on (e.g., in response to) the indication of the error, the host device 105-*a* may transmit to the memory device 110-*a* a power-saving mode exit command that indicates the memory device 110-*a* is to exit the power-saving mode. The power-saving mode exit command may be transmitted over the at least one transmission line that is coupled with the enabled receiver of the disabled the C/A interface and may be transmitted asynchronously (because the clock interface is disabled). In some examples, the power-saving mode exit command may be represented by a change in voltage level on the at least one transmission line. Based on (e.g., in response to) the power-saving mode exit command, the memory device 110-*a* may partially or wholly exit the power-saving mode by enabling one or more of the interface(s) 225. For example, the memory device 110-*a* may enable the C/A interface and the clock interface to accommodate commands from the host device 105-*a*. In some examples, the memory device 110-*a* may also disable self-refresh operations as part of exiting the power-saving mode.

After transmitting the power-saving mode exit command, the host device 105-*a* may transmit (e.g., over the C/A bus) a request for the error information. Based on (e.g., in response to) the request, the memory device 110-*a* may read the error information from the register(s) 210 and transmit (e.g., over the data bus 215 via the data interface) the error information to the host device 105-*a*. For example, the memory device 110-*a* may transmit error type information and address information associated with the error. The memory device 110-*a* may determine the type of the error based on the error type flags. The memory device 110-*a* may determine the address information based on the address information stored in the registers, and may determine which register (or register fields) to read based on the error type. For example, if the error type flags indicate that the error in an uncorrectable error, the memory device 110-*a* may read registers E and F for the address information associated with the uncorrectable error. If the error type flags indicate that the error in a correctable error, the memory device 110-*a* may read registers C and D for the address information associated with the correctable error.

The host device 105-*a* may use the error information to manage access operations. For example, if the error information indicates that the error is an uncorrectable error, the host device 105-*a* may instruct the memory device 110-*a* to overwrite the codeword associated with the error with a corrected version of the codeword. For example, the host device 105-*a* may transmit a write command and the data for the codeword to the memory device 110-*a*. The address indicated by (or associated with) the write command be based on the address associated with the error. In another example, if the host device 105-*a* determines that the address associated with the error has been subject to a threshold quantity of errors (e.g., a threshold quantity of uncorrectable errors), the host device 105-*a* may add the address associated with the error to a list of addresses to avoid for access operations. Alternatively, the host device 105-*a* may replace the address for the set of memory cells with a second address for a second set of memory cells (e.g., the host device 105-*a* may perform post package repair).

In another example, if the host device 105-*a* determines that the memory array associated with the error has been subject to a threshold quantity of errors (e.g., a threshold quantity of correctable errors), the host device 105-*a* may add the memory array associated with the error to a list of memory arrays to avoid for access operations.

By alerting the host device 105-*a* to errors detected as part of an error detection procedure performed by the memory device 110-*a* while the memory device is in the power-saving mode, the memory device 110-*a* may help the host device 105-*a* obtain error information that would otherwise be overwritten.

Figure 3:
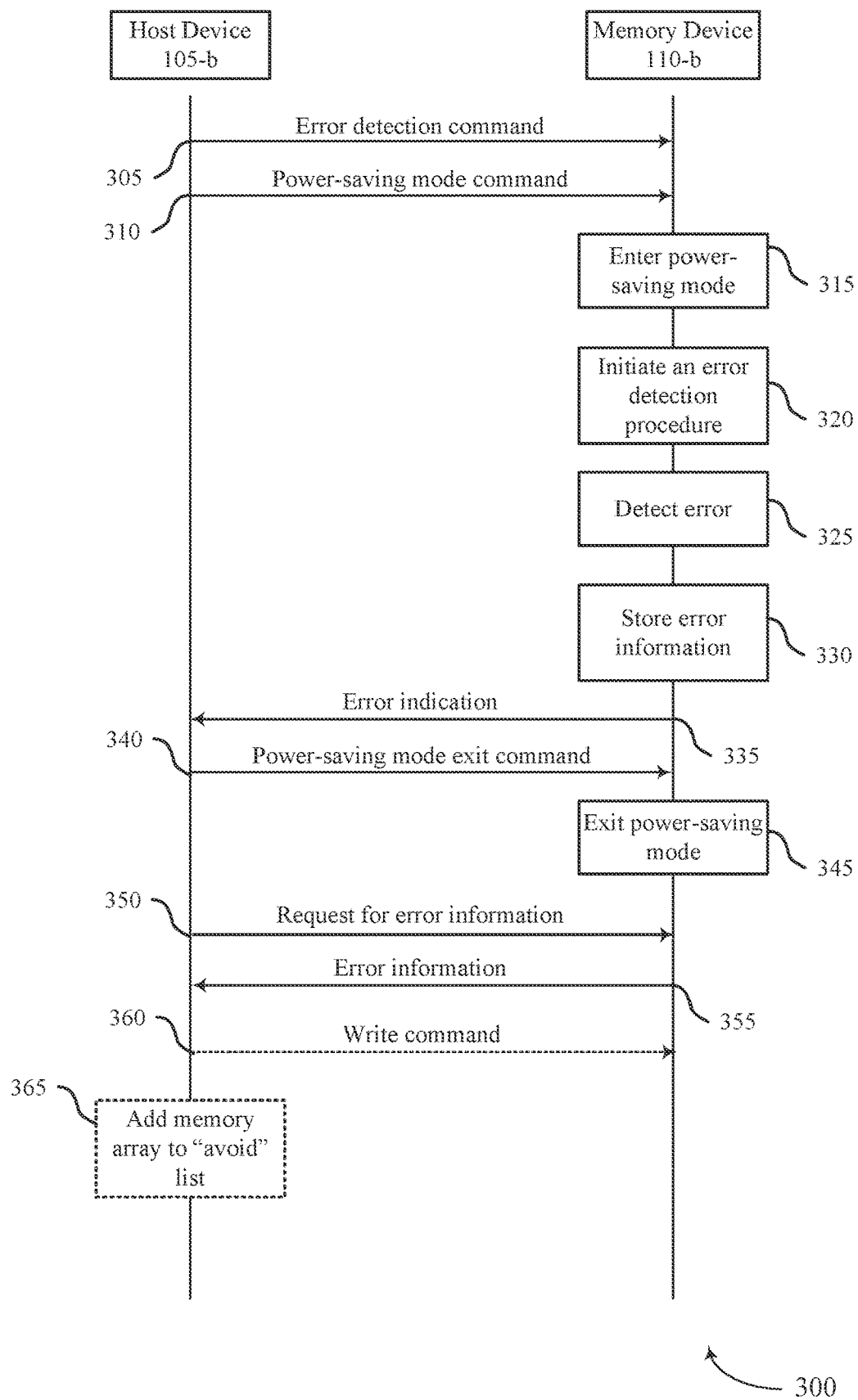
FIG. 3 illustrates an example of a process flow that supports error information signaling in accordance with examples as disclosed herein.

FIG. 3 illustrates an example of a process flow 300 that supports error information signaling for memory in accordance with examples as disclosed herein. The process flow 300 may be implemented by a host device 105-*b* and a memory device 110-*b*, which may be examples of a host device and a memory device, respectively, as described herein. Implementation of the process flow 300 may allow the host device 105-*b* to obtain error information for errors detected during an error detection procedure that is performed by the memory device 110-*b* is in the power-saving mode.

At 305, the host device 105-*b* may transmit an error detection command to the memory device 110-*b*. The error detection command may enable, or instruct the memory device 110-*b* to perform, an error detection procedure. At 310, the host device 105-*b* may transmit a power-saving mode command to the memory device 110-*b*. The power-saving mode command may instruct the memory device 110-*b* to enter a power-saving mode as described herein. Thus, between the error detection command and the power-saving mode command, the memory device 110-*b* may receive an indication that the memory device 110-*b* is to perform the error detection procedure while operating in the power-saving mode.

At 315, the memory device 110-*b* may enter the power-saving mode, which may include disabling one or more interfaces between the memory device 110-*b* and the host device 105-*b*. For example, the memory device 110-*b* may disable the clock interface (e.g., by powering down the receiver(s) of the clock interface and configuring the driver(s) of the clock interface with a high impedance or to drive a static signal) and may disable the C/A interface (e.g., by powering down some, but not all, of the receiver(s) of the C/A interface and configuring some, but not all, of the driver(s) of the clock interface with a high impedance or to drive a static signal). Disabling the one or more interfaces may conserve power at the memory device 110-*b*. In some examples, entering the power-saving mode may also include enabling self-refresh operations. The memory device 110-*b* may enter the power-saving mode based on the power-saving mode command received at 310.

At 320, the memory device 110-*b* may initiate an error detection procedure on a memory array of the memory device 110-*b*. The memory device 110-*b* may initiate the error detection procedure while the memory device 110-*b* is in the power-saving mode and based on (e.g., in response to) the error detection command received at 305.

At 325, the memory device 110-*b* may detect an error based at least in part on performing the error detection procedure. The error may be detected in a codeword stored in the memory array and may be an uncorrectable error or a correctable error. At 330, the memory device 110-*b* may store error information associated with the error. For example, the memory device 110-*b* may store the error information in one or more registers of the memory device 110-*b*. The error information may be stored based on detecting the error and may include error type information, counter information, and address information, among other error information described herein.

At 335, the memory device 110-*b* may indicate the error to the host device 105-*b*. In some examples, the memory device 110-*b* may indicate the error to the host device 105-*b* by changing the voltage on the alert transmission line from a first level (e.g., a default level) to a second level that is associated with error detection. Alternatively, the memory device 110-*b* may indicate the error by transmitting a message that indicates the error to the host device 105-*b*. The memory device 110-*b* may indicate the error to the host device 105-*b* while the memory device 110-*b* is still in the power-saving mode.

In some examples, the memory device 110-*b* may indicate the error based on the type of the error. For example, the memory device may indicate the error if the error is an uncorrectable error. In some examples, the memory device 110-*b* may indicate the error based on the type of the error and the quantity of errors of that type associated with address of the error. For example, the memory device may indicate the error if the error is a correctable error and the address of the error has experienced a threshold quantity of correctable errors.

At 340, the host device 105-*b* may transmit a power-saving mode exit command to the memory device 110-*b*. In some examples, the host device may transmit the power-saving mode exit command asynchronously over the C/A transmission line that is coupled with the enabled receiver of the disabled C/A interface. The host device 105-*b* may transmit the power-saving mode exit command based on the error indication received at 335. For example, the host device 105-*b* may transmit the power-saving mode exit command based on determining that the memory device 110-*b* detected an error during the power-saving mode, the determination of which may be based on the indication of the error. In some examples, determining that the memory device 110-*b* detected the error may include determining that the voltage on the alert transmission line has changed from the first level to the second level that is associated with error detection. In some examples, determining that the memory device 110-*b* detected the error may include receiving the message indicating the error.

At 345, the memory device 110-*b* may exit the power-saving mode, which may include enabling the one or more interfaces disabled at 315. Exiting the power-saving mode may also include disabling self-refresh operations. The memory device 110-*b* may exit the power-saving mode based on the power-saving mode exit command 340.

At 350, the host device 105-*b* may transmit a request for error information associated with the error. The host device 105-*b* may transmit the request over the C/A bus coupled with the enabled C/A interface. The request may be transmitted synchronously with a clock signal conveyed over the transmission line(s) of the clock bus coupled with the enabled clock interface. At 355, the memory device 110-*b* may transmit the error information associated with the error. The memory device 110-*b* may transmit the error information over the data bus coupled with the data interface. The memory device 110-*b* may transmit the error information based on (e.g., in response to) the request received at 350. To transmit the error information, the memory device 110-*b* may read the error information from the one or more registers.

In some examples, the memory device 110-*b* may detect a second error in a second codeword after indicating the error at 335 (or after indicating the error information at 355). In such a scenario, the memory device 110-*b* may replace the error information in the one or more registers with second error information associated with the second error.

After 355, the host device 105-*b* may transmit a power-saving mode command to the memory device 110-*b* so that the memory device 110-*b* re-enters the power-saving mode. The host device 105-*b* may transmit the power-saving mode command over the C/A bus coupled with the enabled C/A interface. Alternatively, the memory device 110-*b* may re-enter the power-saving mode autonomously (e.g., independent of a command from the host device 105-*b*). If the error detection procedure has not concluded (e.g., if the memory device 110-*b* has only checked a portion of the memory array for errors), the memory device 110-*b* may continue the error detection procedure and repeat the operations between 325 and 355.

If the error information includes error type information that indicates the error is an uncorrectable error, the host device 105-*b* may transmit, at 360, a write command so that the data (e.g., codeword) at the address is overwritten with a correct version of the data. If the error information includes error type information that indicates the error is a correctable error, the host device 105-*b* may increment an error counter for the memory array indicated by the address information. If the error counter exceeds a threshold quantity, the host device 105-*b* may determine that the memory array in unreliable and may, at 365, add the memory array to a list of memory arrays to avoid for access operations. Alternatively, the host device 105-*b* may add the memory array to the list of memory addresses if the error information indicates that the memory array is associated with a threshold quantity of correctable errors.

Thus, the host device 105-*b* may manage the memory device 110-*b* based on the error information. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
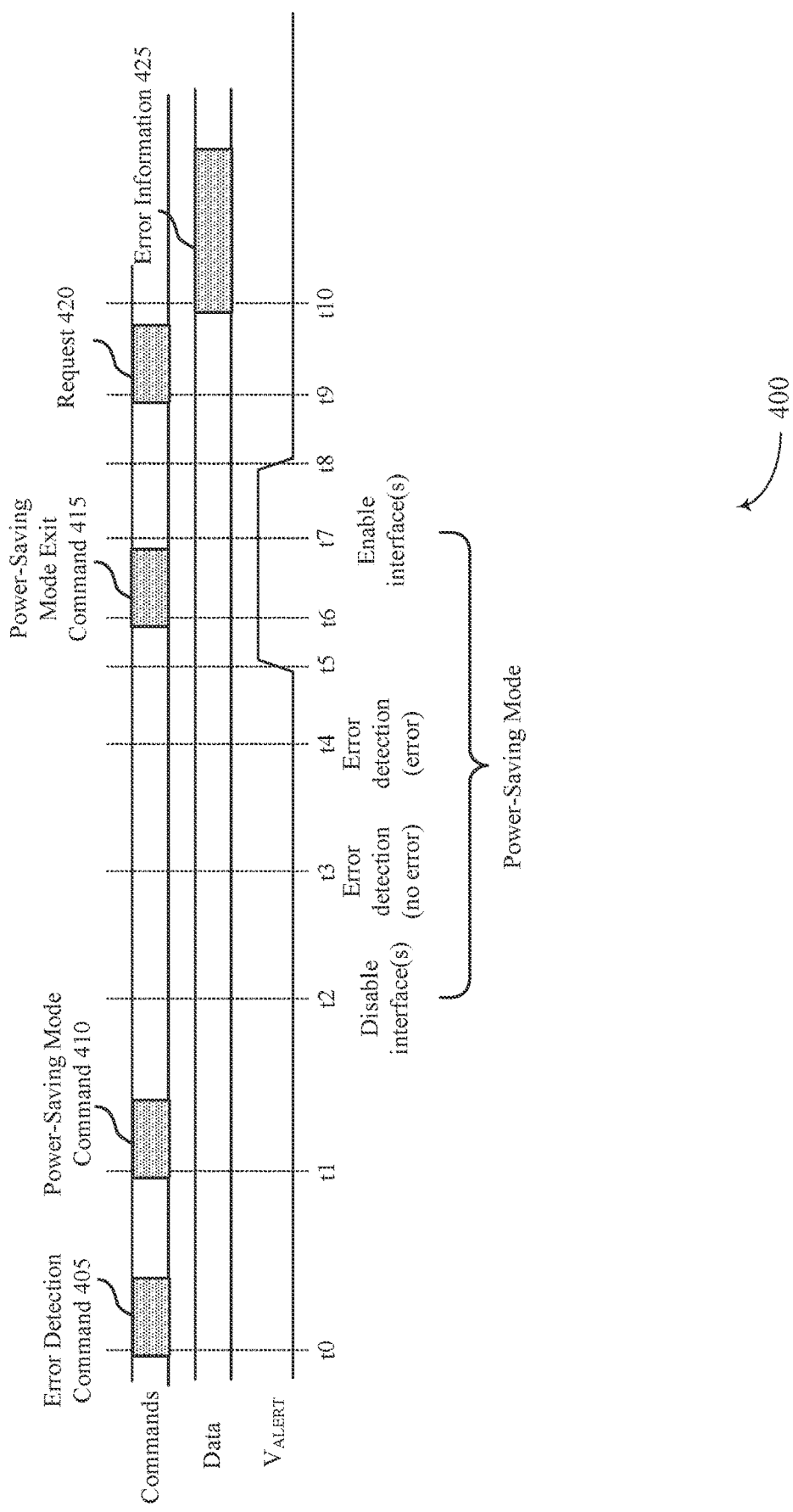
FIG. 4 illustrates an example of a timing diagram that supports error information signaling in accordance with examples as disclosed herein.

FIG. 4 illustrates an example of a timing diagram 400 that supports error information signaling for memory in accordance with examples as disclosed herein. The timing diagram 400 may illustrate signaling between a host device and a memory device as described herein. For example, the timing diagram 400 may illustrate commands that are transmitted from the host device to the memory device over a command and address bus coupled with a C/A interface. The timing diagram 400 may also illustrate data that is transmitted from the memory device to the host device over a data bus coupled with a data interface. The timing diagram 400 may also illustrate the voltage on an alert transmission line (denoted $V_{ALERT}$) between the memory device and the host device. Signaling according to the timing diagram 400 may allow the host device to obtain error information for errors detected during an error detection procedure that is performed by the memory device in the power-saving mode.

Before time t0, the memory device may be in the active mode in which self-refresh operations are disabled and in which various interfaces between the memory device and the host device are enabled. At time t0, the host device may transmit an error detection command 405 that enables an error detection procedure or that instructs the memory device to perform an error detection procedure. At time t1, the host device may transmit a power-saving mode command 410 that instructs the memory device to enter the power-saving mode. At time t2, the memory device may, in response to the power-saving mode command and as part of entering the power-saving mode, disable one or more interfaces coupled with (and between) the memory device and the host device. For example, the memory device may disable the clock interface and the C/A interface as described herein. The memory device may also enable self-refresh operations as part of the power-saving mode.

In some examples, the host device may transmit a request for error information before transmitting the power-saving mode command at time t1. In such examples, the memory device may transmit error information to the host device in response to the request and before time t1.

At time t3, the memory device may perform a first error detection procedure on a first location of a memory array that stores a first codeword. No errors may be detected in the codeword as part of the error detection procedure, so the memory device may not store any error information. At time t4, the memory device may perform a second error detection procedure on a second location of the memory array that stores a second codeword. As part of the second error detection procedure, the memory device may detect an error in the second codeword. The error may be a correctable error or an uncorrectable error. The memory device may store (e.g., in one or more registers) error information associated with the error based on detecting the error.

At time t5, the memory device may indicate the error to the host device by modifying the voltage on the alert transmission line from a first level (e.g., a default level) to a second level (e.g., a level associated with error detection). At time t6, the host device may, in response to the voltage change on the alert transmission line, transmit a power-saving mode exit command 415 to the memory device. For example, the host device may transmit a power-saving mode exit command over a transmission line of the C/A bus that is coupled with an enabled receiver of the C/A interface. At time t7, the memory device may enable the one or more interface(s) that were disabled at t2. For example, the memory device may enable the clock interface and the C/A interface as described herein. The memory device may enable the one or more interface(s) as part of exiting the power-saving mode. In some examples, the memory device may also disable self-refresh operations as part of exiting the power-saving mode. At time t8, the memory device may reset the voltage on the alert transmission line to the default value (e.g., the memory device may modify the voltage on the alert transmission line from the second value to the first value).

At time t9, the host device may transmit (e.g., over the C/A bus coupled with the enabled C/A interface) a request 420 for the memory device to transmit error information associated with the error indicated by the alert transmission line. At time t10, the memory device may transmit the error information associated with the error (error information 425) to the host device. To do so, the memory device may read the error information from the register(s) in which the error information was stored. In some examples, the memory device may detect a second error in another codeword after indicating the error at time t5 (or after indicating the error information at time t10). In such a scenario, the memory device may replace the error information in the one or more registers with second error information associated with the second error.

After transmitting the error information, the memory device may re-enter the power-saving mode and continue to perform the error detection procedure. Upon receipt of the error information, the host device may engage in on or more memory management operations based on the error information.

Thus, the host device may obtain error information for an error detected by the memory device while the memory device is in the power-saving mode.

Figure 5:
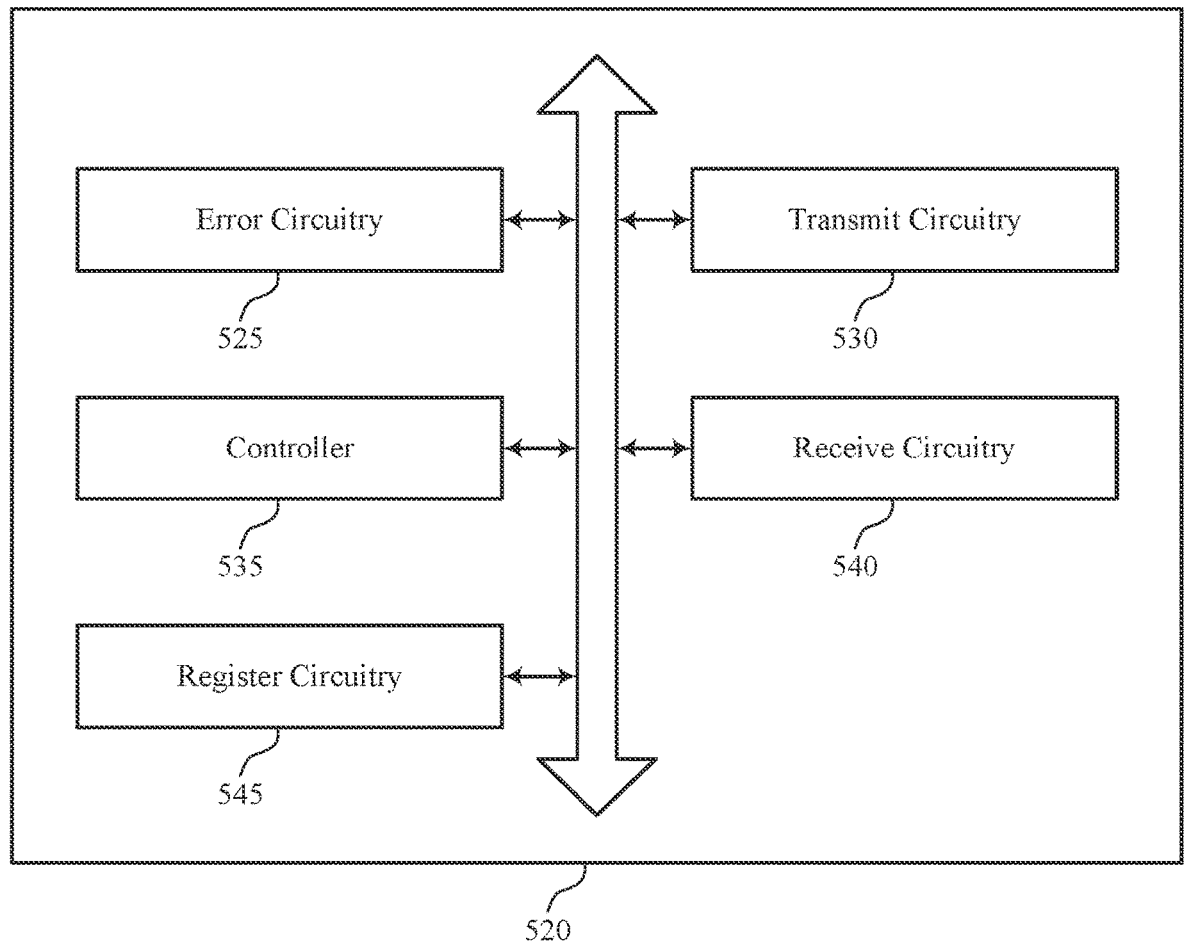
FIG. 5 shows a block diagram of a memory device that supports error information signaling in accordance with examples as disclosed herein.

FIG. 5 shows a block diagram 500 of a memory device 520 that supports error information signaling for memory in accordance with examples as disclosed herein. The memory device 520 may be an example of aspects of a memory device as described with reference to FIGS. 1 through 4. The memory device 520, or various components thereof, may be an example of means for performing various aspects of error information signaling for memory as described herein. For example, the memory device 520 may include an error circuitry 525, a transmit circuitry 530, a controller 535, a receive circuitry 540, a register circuitry 545, or any combination thereof. Each of these components may communicate, directly or indirectly, with one another (e.g., via one or more buses).

The error circuitry 525 may be configured as or otherwise support a means for detecting, by a memory device while in a power-saving mode in which one or more interfaces between the memory device and a host device are disabled, an error in a codeword stored in a memory array of the memory device. The transmit circuitry 530 may be configured as or otherwise support a means for indicating the error to the host device while the memory device is in the power-saving mode and based at least in part on detecting the error. The controller 535 may be configured as or otherwise support a means for enabling the one or more interfaces based at least in part on indicating the error to the host device. In some examples, the transmit circuitry 530 may be configured as or otherwise support a means for transmitting, to the host device, error information associated with the error based at least in part on enabling the one or more interfaces.

In some examples, the error information indicates that the error is an uncorrectable error, and the receive circuitry 540 may be configured as or otherwise support a means for receiving a command to overwrite the codeword based at least in part on the error being the uncorrectable error.

In some examples, the controller 535 may be configured as or otherwise support a means for disabling the one or more interfaces as part of entering the power-saving mode, where disabling the one or more interfaces includes. In some examples, the controller 535 may be configured as or otherwise support a means for disabling a receiver of a first interface coupled with a transmission line that is configured to convey clock signals. In some examples, the controller 535 may be configured as or otherwise support a means for disabling a subset of a set of receivers of a second interface that is coupled with a bus that is configured to convey command and address information.

In some examples, the receive circuitry 540 may be configured as or otherwise support a means for receiving a command to exit the power-saving mode over a transmission line of the bus that is coupled with an enabled receiver of the second interface, where the one or more interfaces are enabled based at least in part on the command.

In some examples, to support indicating the error, the transmit circuitry 530 may be configured as or otherwise support a means for modifying, from a first level to a second level, a voltage on a transmission line between the memory device and the host device.

In some examples, the register circuitry 545 may be configured as or otherwise support a means for storing the error information in one or more registers of the memory device based at least in part on detecting the error. In some examples, the receive circuitry 540 may be configured as or otherwise support a means for receiving a command to transmit the error information to the host device based at least in part on indicating the error, where the error information is read from the one or more registers based at least in part on the command to transmit the error information.

In some examples, the error information includes error type information and address information associated with the error, and the register circuitry 545 may be configured as or otherwise support a means for reading the address information associated with the error from the one or more registers based at least in part on the error type information.

In some examples, the error circuitry 525 may be configured as or otherwise support a means for detecting a second error in a second codeword of the memory array after indicating the error to the host device. In some examples, the register circuitry 545 may be configured as or otherwise support a means for replacing the error information in the one or more registers with second error information associated with the second error based at least in part on detecting the second error.

In some examples, the receive circuitry 540 may be configured as or otherwise support a means for receiving an indication to perform an error detection procedure while the memory device is in the power-saving mode. In some examples, the error circuitry 525 may be configured as or otherwise support a means for performing the error detection procedure while in the power-saving mode, where the error is detected based at least in part on performing the error detection procedure.

In some examples, the power-saving mode includes a mode in which the memory device performs self-refresh operations on the memory array, and the controller 535 may be configured as or otherwise support a means for exiting the power-saving mode based at least in part on indicating the error to the host device, where enabling the one or more interfaces is part of exiting the power-saving mode.

In some examples, the receive circuitry 540 may be configured as or otherwise support a means for receiving a command to exit the power-saving mode based at least in part on indicating the error to the host device, where exiting the power-saving mode is based at least in part on the command to exit the power-saving mode.

Figure 6:
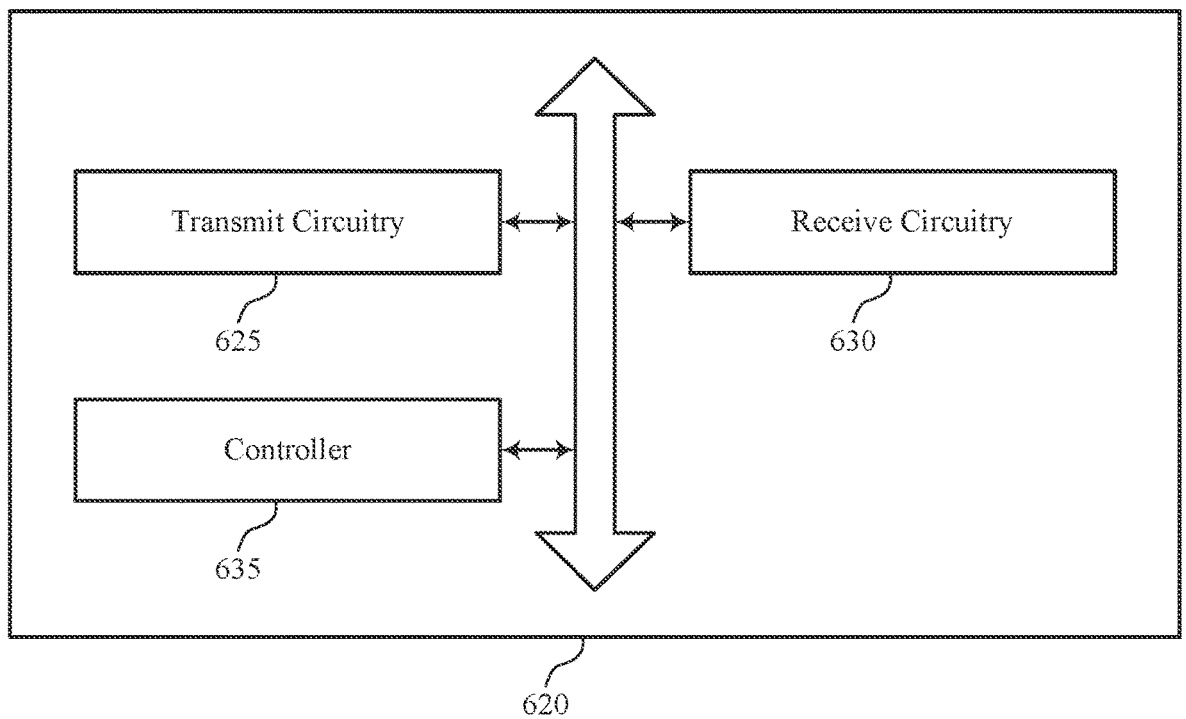
FIG. 6 shows a block diagram of a host device that supports error information signaling in accordance with examples as disclosed herein.

FIG. 6 shows a block diagram 600 of a host device 620 that supports error information signaling for memory in accordance with examples as disclosed herein. The host device 620 may be an example of aspects of a host device as described with reference to FIGS. 1 through 4. The host device 620, or various components thereof, may be an example of means for performing various aspects of error information signaling for memory as described herein. For example, the host device 620 may include a transmit circuitry 625, a receive circuitry 630, a controller 635, or any combination thereof. Each of these components may communicate, directly or indirectly, with one another (e.g., via one or more buses).

The transmit circuitry 625 may be configured as or otherwise support a means for transmitting, by a host device, a command to enter a power-saving mode in which one or more interfaces between a memory device and the host device are disabled. The receive circuitry 630 may be configured as or otherwise support a means for receiving an indication of an error detected by the memory device while in the power-saving mode in a codeword stored in a memory array of the memory device. In some examples, the transmit circuitry 625 may be configured as or otherwise support a means for transmitting, by the host device, a command to exit the power-saving mode based at least in part on receiving the indication of the error. In some examples, the receive circuitry 630 may be configured as or otherwise support a means for receiving, at the host device, error information associated with the error based at least in part on transmitting the command to exit the power-saving mode.

In some examples, the controller 635 may be configured as or otherwise support a means for determining, based at least in part on the error information, that the error is an uncorrectable error. In some examples, the transmit circuitry 625 may be configured as or otherwise support a means for transmitting a command to overwrite the codeword based at least in part on determining that the error in the uncorrectable error.

In some examples, the error information indicates address information for a set of memory cells associated with the codeword, and the controller 635 may be configured as or otherwise support a means for determining, based at least in part on the error information, that the set of memory cells is associated with a threshold quantity of errors. In some examples, the error information indicates address information for a set of memory cells associated with the codeword, and the controller 635 may be configured as or otherwise support a means for adding the set of memory cells to a list of sets of memory cells to avoid for access operations based at least in part on the set of memory cells being associated with the threshold quantity of errors.

In some examples, to support receiving the indication of the error, the receive circuitry 630 may be configured as or otherwise support a means for receiving an indication that a voltage on a transmission line between the memory device and the host device has changed from a first level to a second level.

In some examples, the transmit circuitry 625 may be configured as or otherwise support a means for transmitting a request for the error information based at least in part on transmitting the command to exit the power-saving mode, where the error information is received based at least in part on transmitting the request.

In some examples, the transmit circuitry 625 may be configured as or otherwise support a means for transmitting, to the memory device, an indication to perform an error detection procedure while the memory device is in the power-saving mode, where the indication of the error is received based at least in part on transmitting the indication to perform the error detection procedure.

In some examples, the error information includes error type information and address information associated with the error.

Figure 7:
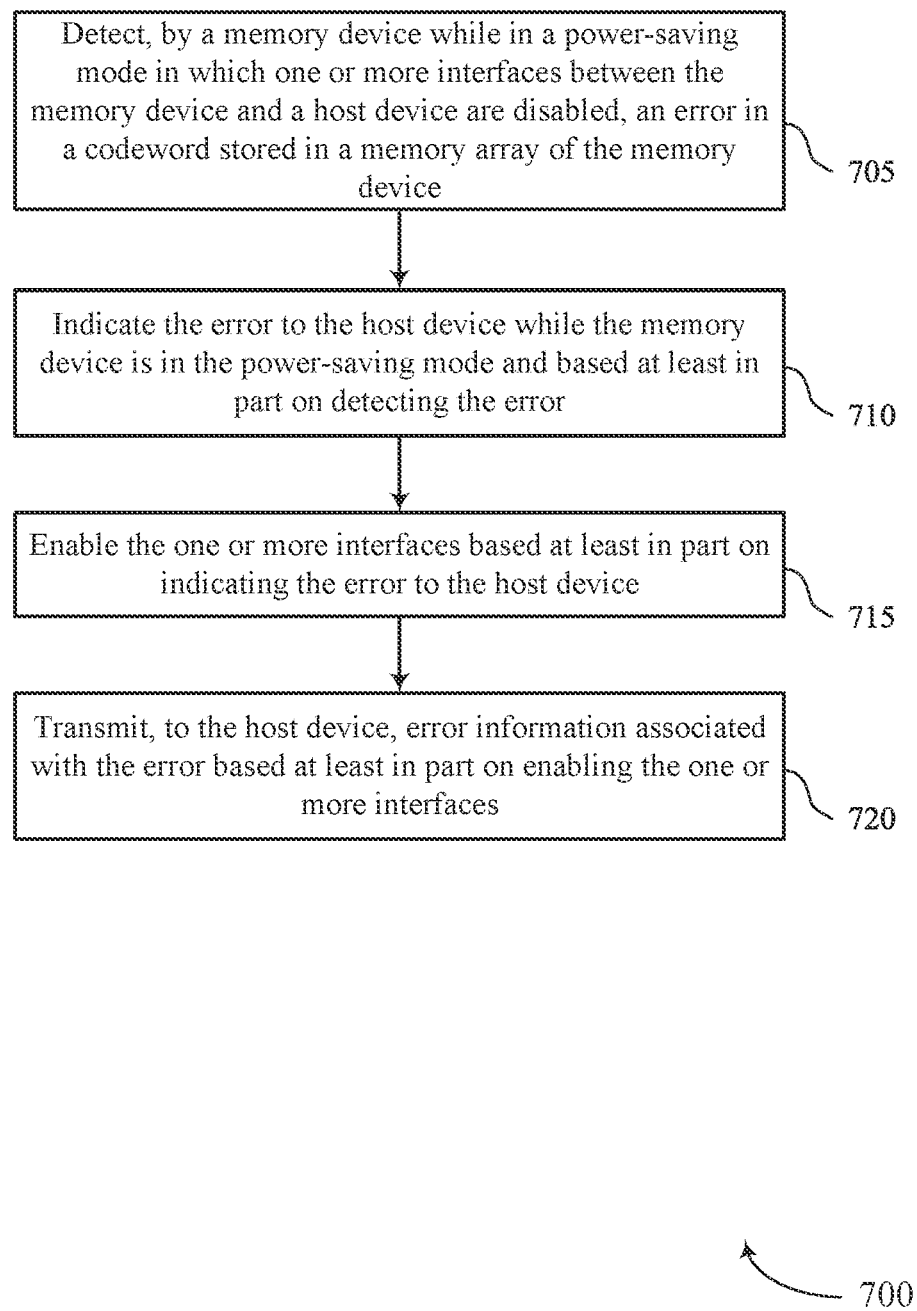
FIGS. 7 and 8 show flowcharts illustrating a method or methods that support error information signaling in accordance with examples as disclosed herein.

FIG. 7 shows a flowchart illustrating a method 700 that supports error information signaling for memory in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include detecting, by a memory device while in a power-saving mode in which one or more interfaces between the memory device and a host device are disabled, an error in a codeword stored in a memory array of the memory device. The operations of 705 may be performed in accordance with examples as disclosed herein. In some examples, aspects of the operations of 705 may be performed by an error circuitry 525 as described with reference to FIG. 5.

At 710, the method may include indicating the error to the host device while the memory device is in the power-saving mode and based at least in part on detecting the error. The operations of 710 may be performed in accordance with examples as disclosed herein. In some examples, aspects of the operations of 710 may be performed by a transmit circuitry 530 as described with reference to FIG. 5.

At 715, the method may include enabling the one or more interfaces based at least in part on indicating the error to the host device. The operations of 715 may be performed in accordance with examples as disclosed herein. In some examples, aspects of the operations of 715 may be performed by a controller 535 as described with reference to FIG. 5.

At 720, the method may include transmitting, to the host device, error information associated with the error based at least in part on enabling the one or more interfaces. The operations of 720 may be performed in accordance with examples as disclosed herein. In some examples, aspects of the operations of 720 may be performed by a transmit circuitry 530 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for detecting, by a memory device while in a power-saving mode in which one or more interfaces between the memory device and a host device are disabled, an error in a codeword stored in a memory array of the memory device; indicating the error to the host device while the memory device is in the power-saving mode and based at least in part on detecting the error; enabling the one or more interfaces based at least in part on indicating the error to the host device; and transmitting, to the host device, error information associated with the error based at least in part on enabling the one or more interfaces.

Aspect 2: The method, apparatus, or non-transitory computer-readable medium of aspect 1 where the error information indicates that the error is an uncorrectable error and the method, apparatuses, and non-transitory computer-readable medium, further includes operations, features, circuitry, logic, means, or instructions, or any combination thereof for receiving a command to overwrite the codeword based at least in part on the error being the uncorrectable error.

Aspect 3: The method, apparatus, or non-transitory computer-readable medium of any of aspects 1 through 2, further including operations, features, circuitry, logic, means, or instructions, or any combination thereof for disabling the one or more interfaces as part of entering the power-saving mode, where disabling the one or more interfaces includes; disabling a receiver of a first interface coupled with a transmission line that is configured to convey clock signals; and disabling a subset of a set of receivers of a second interface that is coupled with a bus that is configured to convey command and address information.

Aspect 4: The method, apparatus, or non-transitory computer-readable medium of aspect 3, further including operations, features, circuitry, logic, means, or instructions, or any combination thereof for receiving a command to exit the power-saving mode over a transmission line of the bus that is coupled with an enabled receiver of the second interface, where the one or more interfaces are enabled based at least in part on the command.

Aspect 5: The method, apparatus, or non-transitory computer-readable medium of any of aspects 1 through 4 where indicating the error includes operations, features, circuitry, logic, means, or instructions, or any combination thereof for modifying, from a first level to a second level, a voltage on a transmission line between the memory device and the host device.

Aspect 6: The method, apparatus, or non-transitory computer-readable medium of any of aspects 1 through 5, further including operations, features, circuitry, logic, means, or instructions, or any combination thereof for storing the error information in one or more registers of the memory device based at least in part on detecting the error and receiving a command to transmit the error information to the host device based at least in part on indicating the error, where the error information is read from the one or more registers based at least in part on the command to transmit the error information.

Aspect 7: The method, apparatus, or non-transitory computer-readable medium of aspect 6 where the error information includes error type information and address information associated with the error and the method, apparatuses, and non-transitory computer-readable medium, further includes operations, features, circuitry, logic, means, or instructions, or any combination thereof for reading the address information associated with the error from the one or more registers based at least in part on the error type information.

Aspect 8: The method, apparatus, or non-transitory computer-readable medium of any of aspects 6 through 7, further including operations, features, circuitry, logic, means, or instructions, or any combination thereof for detecting a second error in a second codeword of the memory array after indicating the error to the host device and replacing the error information in the one or more registers with second error information associated with the second error based at least in part on detecting the second error.

Aspect 9: The method, apparatus, or non-transitory computer-readable medium of any of aspects 1 through 8, further including operations, features, circuitry, logic, means, or instructions, or any combination thereof for receiving an indication to perform an error detection procedure while the memory device is in the power-saving mode and performing the error detection procedure while in the power-saving mode, where the error is detected based at least in part on performing the error detection procedure.

Aspect 10: The method, apparatus, or non-transitory computer-readable medium of any of aspects 1 through 9 where the power-saving mode includes a mode in which the memory device performs self-refresh operations on the memory array and the method, apparatuses, and non-transitory computer-readable medium, further includes operations, features, circuitry, logic, means, or instructions, or any combination thereof for exiting the power-saving mode based at least in part on indicating the error to the host device, where enabling the one or more interfaces is part of exiting the power-saving mode.

Aspect 11: The method, apparatus, or non-transitory computer-readable medium of aspect 10, further including operations, features, circuitry, logic, means, or instructions, or any combination thereof for receiving a command to exit the power-saving mode based at least in part on indicating the error to the host device, where exiting the power-saving mode is based at least in part on the command to exit the power-saving mode.

Figure 8:
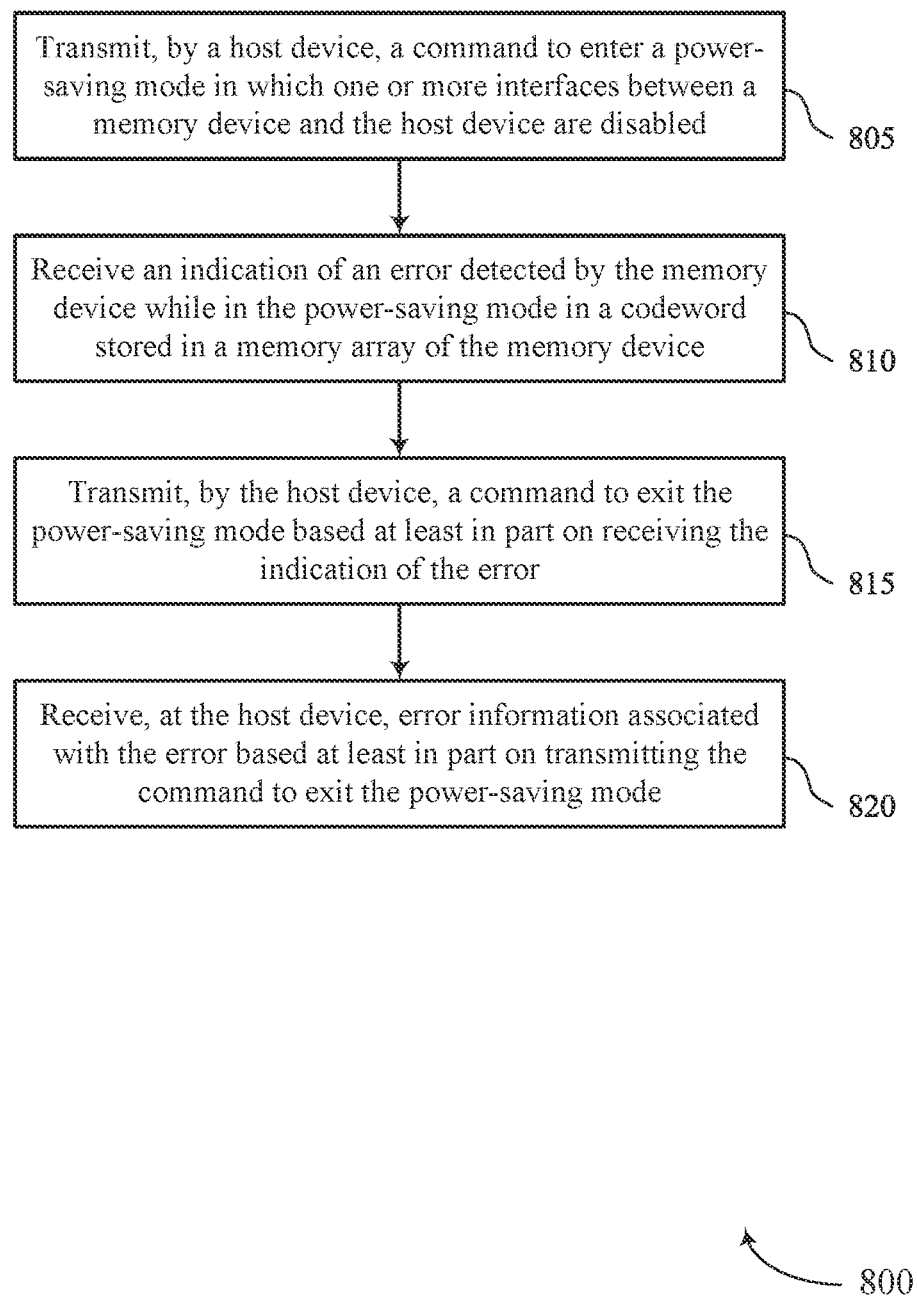

FIG. 8 shows a flowchart illustrating a method 800 that supports error information signaling for memory in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the device to perform the described functions. Additionally, or alternatively, the host device may perform aspects of the described functions using special-purpose hardware.

At 805, the method may include transmitting, by a host device, a command to enter a power-saving mode in which one or more interfaces between a memory device and the host device are disabled. The operations of 805 may be performed in accordance with examples as disclosed herein. In some examples, aspects of the operations of 805 may be performed by a transmit circuitry 625 as described with reference to FIG. 6.

At 810, the method may include receiving an indication of an error detected by the memory device while in the power-saving mode in a codeword stored in a memory array of the memory device. The operations of 810 may be performed in accordance with examples as disclosed herein. In some examples, aspects of the operations of 810 may be performed by a receive circuitry 630 as described with reference to FIG. 6.

At 815, the method may include transmitting, by the host device, a command to exit the power-saving mode based at least in part on receiving the indication of the error. The operations of 815 may be performed in accordance with examples as disclosed herein. In some examples, aspects of the operations of 815 may be performed by a transmit circuitry 625 as described with reference to FIG. 6.

At 820, the method may include receiving, at the host device, error information associated with the error based at least in part on transmitting the command to exit the power-saving mode. The operations of 820 may be performed in accordance with examples as disclosed herein. In some examples, aspects of the operations of 820 may be performed by a receive circuitry 630 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for transmitting, by a host device, a command to enter a power-saving mode in which one or more interfaces between a memory device and the host device are disabled; receiving an indication of an error detected by the memory device while in the power-saving mode in a codeword stored in a memory array of the memory device; transmitting, by the host device, a command to exit the power-saving mode based at least in part on receiving the indication of the error; and receiving, at the host device, error information associated with the error based at least in part on transmitting the command to exit the power-saving mode.

Aspect 13: The method, apparatus, or non-transitory computer-readable medium of aspect 12, further including operations, features, circuitry, logic, means, or instructions, or any combination thereof for determining, based at least in part on the error information, that the error is an uncorrectable error and transmitting a command to overwrite the codeword based at least in part on determining that the error in the uncorrectable error.

Aspect 14: The method, apparatus, or non-transitory computer-readable medium of any of aspects 12 through 13 where the error information indicates address information for a set of memory cells associated with the codeword and the method, apparatuses, and non-transitory computer-readable medium, further includes operations, features, circuitry, logic, means, or instructions, or any combination thereof for determining, based at least in part on the error information, that the set of memory cells is associated with a threshold quantity of errors and adding the set of memory cells to a list of sets of memory cells to avoid for access operations based at least in part on the set of memory cells being associated with the threshold quantity of errors.

Aspect 15: The method, apparatus, or non-transitory computer-readable medium of any of aspects 12 through 14, where the error information indicates address information for a set of memory cells associated with the codeword and the method, apparatuses, and non-transitory computer-readable medium, further includes operations, features, circuitry, logic, means, or instructions, or any combination thereof for determining, based at least in part on the error information, that the error is an uncorrectable error and replacing the address for the set of memory cells with a second address for a second set of memory cells based at least in part on the error being an uncorrectable error.

Aspect 16: The method, apparatus, or non-transitory computer-readable medium of any of aspects 12 through 15 where receiving the indication of the error includes operations, features, circuitry, logic, means, or instructions, or any combination thereof for receiving an indication that a voltage on a transmission line between the memory device and the host device has changed from a first level to a second level.

Aspect 17: The method, apparatus, or non-transitory computer-readable medium of any of aspects 12 through 16, further including operations, features, circuitry, logic, means, or instructions, or any combination thereof for transmitting a request for the error information based at least in part on transmitting the command to exit the power-saving mode, where the error information is received based at least in part on transmitting the request.

Aspect 18: The method, apparatus, or non-transitory computer-readable medium of any of aspects 12 through 17, further including operations, features, circuitry, logic, means, or instructions, or any combination thereof for transmitting, to the memory device, an indication to perform an error detection procedure while the memory device is in the power-saving mode, where the indication of the error is received based at least in part on transmitting the indication to perform the error detection procedure.

Aspect 19: The method, apparatus, or non-transitory computer-readable medium of any of aspects 12 through 18 where the error information includes error type information and address information associated with the error.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 20: An apparatus, including: a memory device including a memory array; and a controller coupled with the memory device and configured to cause the apparatus to: detect, by the memory device while the memory device is in a power-saving mode in which one or more interfaces between the memory device and a host device are disabled, an error in a codeword stored in the memory array; indicate the error to the host device while the memory device is in the power-saving mode and based at least in part on detecting the error; enable the one or more interfaces based at least in part on indicating the error to the host device; and transmit, to the host device, error information associated with the error based at least in part on enabling the one or more interfaces.

Aspect 21: The apparatus of aspect 20, where the error information indicates that the error is an uncorrectable error, and where the controller is further configured to cause the apparatus to: receive a command to overwrite the codeword based at least in part on the error being the uncorrectable error.

Aspect 22: The apparatus of any of aspects 20 through 21, where the controller is further configured to: store the error information in one or more registers of the memory device based at least in part on detecting the error; and receive a command to transmit the error information to the host device based at least in part on indicating the error, where the error information is read from the one or more registers based at least in part on the command to transmit the error information.

An apparatus is described. The following provides an overview of aspects of the apparatus as described herein:

Aspect 23: An apparatus, including: a host device; and a controller coupled with the host device and configured to cause the apparatus to: transmit, by the host device, a command to enter a power-saving mode in which one or more interfaces between a memory device and the host device are disabled; receive an indication of an error detected by the memory device while in the power-saving mode in a codeword stored in a memory array of the memory device; transmit, by the host device, a command to exit the power-saving mode based at least in part on receiving the indication of the error; and receive, by the host device, error information associated with the error based at least in part on transmitting the command to exit the power-saving mode.

Aspect 24: The apparatus of aspect 23, where the controller is further configured to cause the apparatus to: determine, based at least in part on the error information, that the error is an uncorrectable error; and transmit a command to overwrite the codeword based at least in part on determining that the error in an uncorrectable error.

Aspect 25: The apparatus of any of aspects 23 through 24, where the error information indicates address information for a set of memory cells associated with the codeword, and where the controller is further configured to cause the apparatus to: determine, based at least in part on the error information, that the set of memory cells is associated with a threshold quantity of errors; and add the set of memory cells to a list of sets of memory cells to avoid for access operations based at least in part on the set of memory cells being associated with the threshold quantity of errors.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

detecting, by a memory device while in a power-saving mode in which one or more interfaces between the memory device and a host device are disabled, an error in a codeword stored in a memory array of the memory device;

indicating the error to the host device while the memory device is in the power-saving mode and based at least in part on detecting the error;

enabling the one or more interfaces based at least in part on indicating the error to the host device; and transmitting, to the host device, error information associated with the error based at least in part on enabling the one or more interfaces.

2. The method of claim 1, wherein the error information indicates that the error is an uncorrectable error, the method further comprising:

receiving a command to overwrite the codeword based at least in part on the error being the uncorrectable error.

3. The method of claim 1, further comprising:
disabling the one or more interfaces as part of entering the power-saving mode, wherein disabling the one or more interfaces comprises:
  disabling a receiver of a first interface coupled with a transmission line that is configured to convey clock signals; and
  disabling a subset of a set of receivers of a second interface that is coupled with a bus that is configured to convey command and address information.

4. The method of claim 3, further comprising:
receiving a command to exit the power-saving mode over a transmission line of the bus that is coupled with an enabled receiver of the second interface, wherein the one or more interfaces are enabled based at least in part on the command.

5. The method of claim 1, wherein indicating the error comprises:
modifying, from a first level to a second level, a voltage on a transmission line between the memory device and the host device.

6. The method of claim 1, further comprising:
storing the error information in one or more registers of the memory device based at least in part on detecting the error; and
receiving a command to transmit the error information to the host device based at least in part on indicating the error, wherein the error information is read from the one or more registers based at least in part on the command to transmit the error information.

7. The method of claim 6, wherein the error information comprises error type information and address information associated with the error, the method further comprising:
reading the address information associated with the error from the one or more registers based at least in part on the error type information.

8. The method of claim 6, further comprising:
detecting a second error in a second codeword of the memory array after transmitting the error information to the host device; and
replacing the error information in the one or more registers with second error information associated with the second error based at least in part on detecting the second error.

9. The method of claim 1, further comprising:
receiving an indication to perform an error detection procedure while the memory device is in the power-saving mode; and
performing the error detection procedure while in the power-saving mode, wherein the error is detected based at least in part on performing the error detection procedure.

10. The method of claim 1, wherein the power-saving mode comprises a mode in which the memory device performs self-refresh operations on the memory array, the method further comprising:
exiting the power-saving mode based at least in part on indicating the error to the host device, wherein enabling the one or more interfaces is part of exiting the power-saving mode.

11. The method of claim 10, further comprising:
receiving a command to exit the power-saving mode based at least in part on indicating the error to the host device, wherein exiting the power-saving mode is based at least in part on the command to exit the power-saving mode.

12. A method, comprising:
transmitting, by a host device, a command to enter a power-saving mode in which one or more interfaces between a memory device and the host device are disabled;
receiving an indication of an error detected by the memory device while in the power-saving mode in a codeword stored in a memory array of the memory device;
transmitting, by the host device, a command to exit the power-saving mode based at least in part on receiving the indication of the error; and
receiving, at the host device, error information associated with the error based at least in part on transmitting the command to exit the power-saving mode.

13. The method of claim 12, further comprising:
determining, based at least in part on the error information, that the error is an uncorrectable error; and
transmitting a command to overwrite the codeword based at least in part on determining that the error in the uncorrectable error.

14. The method of claim 12, wherein the error information indicates address information for a set of memory cells associated with the codeword, the method further comprising:
determining, based at least in part on the error information, that the set of memory cells is associated with a threshold quantity of errors; and
adding the set of memory cells to a list of sets of memory cells to avoid for access operations based at least in part on the set of memory cells being associated with the threshold quantity of errors.

15. The method of claim 12, wherein the error information indicates an address for a set of memory cells associated with the codeword, the method further comprising:
determining, based at least in part on the error information, that the error is an uncorrectable error; and
replacing the address for the set of memory cells with a second address for a second set of memory cells based at least in part on the error being an uncorrectable error.

16. The method of claim 12, wherein receiving the indication of the error comprises:
receiving an indication that a voltage on a transmission line between the memory device and the host device has changed from a first level to a second level.

17. The method of claim 12, further comprising:
transmitting a request for the error information based at least in part on transmitting the command to exit the power-saving mode, wherein the error information is received based at least in part on transmitting the request.

18. The method of claim 12, further comprising:
transmitting, to the memory device, an indication to perform an error detection procedure while the memory device is in the power-saving mode, wherein the indication of the error is received based at least in part on transmitting the indication to perform the error detection procedure.

19. The method of claim 12, wherein the error information comprises error type information and address information associated with the error.

20. An apparatus, comprising:
a memory device comprising a memory array; and
a controller coupled with the memory device and configured to cause the apparatus to:
detect, by the memory device while the memory device is in a power-saving mode in which one or more interfaces between the memory device and a host device are disabled, an error in a codeword stored in the memory array;
indicate the error to the host device while the memory device is in the power-saving mode and based at least in part on detecting the error;
enable the one or more interfaces based at least in part on indicating the error to the host device; and
transmit, to the host device, error information associated with the error based at least in part on enabling the one or more interfaces.

21. The apparatus of claim 20, wherein the error information indicates that the error is an uncorrectable error, and wherein the controller is further configured to cause the apparatus to:
receive a command to overwrite the codeword based at least in part on the error being the uncorrectable error.

22. The apparatus of claim 20, wherein the controller is further configured to:
store the error information in one or more registers of the memory device based at least in part on detecting the error; and
receive a command to transmit the error information to the host device based at least in part on indicating the error, wherein the error information is read from the one or more registers based at least in part on the command to transmit the error information.

23. An apparatus, comprising:
a host device; and
a controller coupled with the host device and configured to cause the apparatus to:
transmit, by the host device, a command to enter a power-saving mode in which one or more interfaces between a memory device and the host device are disabled;
receive an indication of an error detected by the memory device while in the power-saving mode in a codeword stored in a memory array of the memory device;
transmit, by the host device, a command to exit the power-saving mode based at least in part on receiving the indication of the error; and
receive, by the host device, error information associated with the error based at least in part on transmitting the command to exit the power-saving mode.

24. The apparatus of claim 23, wherein the controller is further configured to cause the apparatus to:
determine, based at least in part on the error information, that the error is an uncorrectable error; and
transmit a command to overwrite the codeword based at least in part on determining that the error in an uncorrectable error.

25. The apparatus of claim 23, wherein the error information indicates address information for a set of memory cells associated with the codeword, and wherein the controller is further configured to cause the apparatus to:
determine, based at least in part on the error information, that the set of memory cells is associated with a threshold quantity of errors; and
add the set of memory cells to a list of sets of memory cells to avoid for access operations based at least in part on the set of memory cells being associated with the threshold quantity of errors.

* * * * *